2,924,423

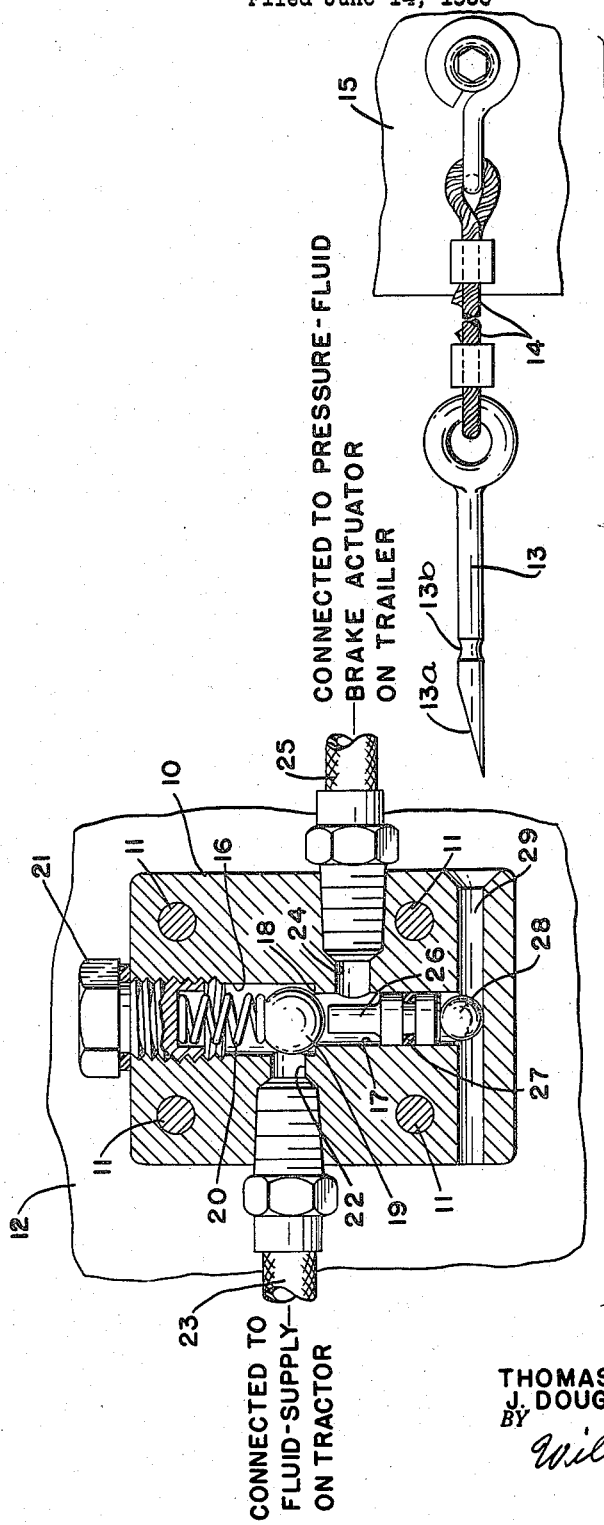

AUTOMATIC EMERGENCY SHUT-OFF VALVE ASSEMBLY

Thomas D. Weiser and J Douglas Bennett, Lakewood, Ohio, assignors to Fawick Corporation, a corporation of Michigan Application June 14, 1956, Serial No. 591,440

1 Claim. (Cl. 251—263)

This invention relates to an automatic emergency shut-off valve assembly suitable for use in a pressure-fluid line extending from pressure-fluid-supplying means on a tractor to pressure-fluid brake-actuating means on a trailer, for charging and venting the said brake-actuating means in the course of ordinary operation but adapted to close the valve automatically in case of the trailer breaking away from the tractor, so that pressure in parts of the line that are on the tractor will not be lost by escape of braking fluid through a break in the line between the valve assembly and the brake-actuating means on the trailer.

Our chief objects are to provide in a valve assembly of this type the advantages of simplicity, economy, dependability and durability, and facility and economy of assembly, disassembly and repair.

Of the accompanying drawing the single figure is a longitudinal section, with parts in elevation and parts broken away, of a valve assembly embodying our invention in its preferred form and parts of the tractor and trailer upon which respective parts of the assembly are mounted.

The assembly comprises a valve casing 10 secured by bolts 11, 11 to a part 12 of the tractor and a pull-pin 13 secured to the forward end of a flexible connecting member such as a cable 14 of which the rear end is secured to a part 15 of the trailer.

The valve casing 10 is formed with a ball-valve and spring chamber 16 extending downward from its upper face and with a valve-opener guide chamber 17 extending downward in continuation of the chamber 16 but of smaller diameter, a valve-seat shoulder 18 thus being provided, at their junction, for a ball-valve 19. The ball is constantly urged toward its seat by a compression spring 20 which is seated at its upper end in a spring-seat recess formed in the lower end of a closure plug 21 which is threaded into the upper end of the chamber 16.

Through a lateral passage 22 the chamber 16 is coupled to a flexible pipe or hose 23 leading, through the usual control valve, not shown, from the usual pressure-fluid supplying means on the tractor and, through a lateral passage 24, the chamber 17 is coupled to a flexible pipe or hose 25 leading to brake-actuating means on the trailer.

For holding the ball 19 at a substantial distance above its seat, for maintaining communication between the conduits 23 and 25 for charging and venting the trailer's brake-actuating means in ordinary service, a ball-lifting pusher 26 has its upper portion of substantially less diameter than that of the chamber 17, for free flow of fluid past that portion, and has its lower portion of larger diameter to serve as a closure piston slidably guided and stabilized in the chamber 17 and formed with an annular groove for an O-ring or soft-packing 27 slidably sealing the piston to the wall of the chamber.

For transmitting lifting force to the pusher piston 26, for opening the valve 19 and holding it open, and for limiting downward movement of the piston in case of emergency closing of the valve 19, a ball 28 of slightly smaller diameter than that of the chamber 17 is mounted in the chamber under the piston and is limited as to its downward movement by the floor of a horizontal pull-pin hole 29 which extends in a fore-and-aft direction through the lower part of the valve casing and transects the lower part of the chamber 17.

The pull-pin 13 is adapted to be thrust into the hole 29, with an easy sliding fit, and is formed at its front end with an inclined flat cam face 13ª for lifting the ball 28, pusher piston 26 and valve ball 19 in being pushed into the hole. It is formed also, at a distance back of its cam face, with an annular groove 13ᵇ of which the wall is transversely curved to fit the ball 28, seating of which in the groove dependably but releasably retains the pin in the hole in ordinary conditions of service. The pin 13 and ball 28 thus serve as latching means for holding the valve open, the ball, in the groove in the pin, acting as a ball-detent. The diameters of the pin and pin hole are less than that of the ball 28, so that the ball cannot escape through the pin hole when the pin is not in place.

The structure as shown and described is such that when the pin is mounted in the hole and retained therein by the ball 28 the valve 19 is open for service, but in case of abnormal separation of the tractor and trailer, as in their breaking away from one another, the pin is pulled from its hole and the spring 20 is thus permitted to close the valve, pressure fluid thus being retained in the braking system of the tractor for continuation of its functioning. The length of the cable 14 or the like preferably is such in relation to slack in the flexible pipe 25 that the valve will be closed before the pipe is broken by the separation of the tractor and trailer. Modifications are possible without departure from the scope of the invention as defined in the appended claim.

We claim:

A valve assembly comprising a valve-casing member formed with a cylindrical valve-and-spring chamber extending inward from an outer face of said member and having a valve-seat at its inner end, a closure for the outer end of said chamber, a valve and its backing spring interposed between said closure and said valve-seat, said spring constantly urging said valve toward its seat, and said casing member being formed also with a cylindrical guide chamber extending from said valve-seat, away from said valve-and-spring chamber, a valve-opening pusher member slidably mounted in said guide chamber and adapted to abut said valve to move it from its seat against the force of its backing spring, a part of said pusher member being formed as a peripherally-sealing closure piston for said guide chamber and another part thereof being of smaller diameter than said piston and projecting from said piston toward said valve for valve-opening contact therewith, the said casing member being formed also with a pull-pin guideway transverse to the direction of the valve's closing movement and means comprising a pull-pin mounted in said guideway for holding said pusher member at valve-open position in said guide chamber, the said casing member being formed also with a fluid passage in communication with the valve-and-spring chamber at a position between the said closure and the said valve-seat, and with a fluid passage in communication with said guide chamber at a position between the said valve-seat and the said piston, the defined pusher member having its maximum diameter smaller than the inner diameter of the valve seat, the defined pull-pin guideway extending to the exterior of the assembly for complete removal of the pull-pin therefrom, and spring-detent means urged transversely of the pull-pin for removably holding the pull-pin in valve-open position.

(References on following page)

References Cited in the file of this patent

UNITED STATES PATENTS

| | | |
|---|---|---|
| 833,554 | Schwoll | Oct. 16, 1906 |
| 1,454,367 | Yardley | May 8, 1923 |
| 1,609,879 | Messmer | Dec. 7, 1926 |
| 2,196,120 | Parker | Apr. 2, 1940 |
| 2,312,549 | Hiner | Mar. 2, 1943 |
| 2,550,379 | Rapisarda | Apr. 24, 1951 |
| 2,711,303 | Ephraim | June 21, 1955 |
| 2,778,599 | Paul | Jan. 22, 1957 |
| 2,785,773 | Jeffrey et al. | Mar. 19, 1957 |
| 2,800,980 | Flockhart | July 30, 1957 |

FOREIGN PATENTS

| | | |
|---|---|---|
| 319,520 | Italy | of 1934 |
| 698,319 | Great Britain | Oct. 14, 1953 |